(12) United States Patent
Nakaya et al.

(10) Patent No.: US 7,593,837 B2
(45) Date of Patent: Sep. 22, 2009

(54) PLANT OPERATION SUPPORT SYSTEM

(75) Inventors: Makoto Nakaya, Musashino (JP);
Gentaro Fukano, Musashino (JP);
Tetsuya Ohtani, Musashino (JP); Kenji Watanabe, Musashino (JP)

(73) Assignee: Yokogawa Elecric Corp., Musashino-shi, Tokyo (JP)

( * ) Notice: Subject to any disclaimer, the term of this patent is extended or adjusted under 35 U.S.C. 154(b) by 387 days.

(21) Appl. No.: 11/079,248

(22) Filed: Mar. 15, 2005

(65) Prior Publication Data

US 2005/0240382 A1  Oct. 27, 2005

(30) Foreign Application Priority Data

Apr. 22, 2004  (JP) .............................. 2004-126524
Nov. 26, 2004  (JP) .............................. 2004-341909

(51) Int. Cl.
*G06G 7/48* (2006.01)

(52) U.S. Cl. .......................................................... 703/6

(58) Field of Classification Search .................... 703/6, 703/7
See application file for complete search history.

(56) References Cited

U.S. PATENT DOCUMENTS

| | | | | |
|---|---|---|---|---|
| 4,853,175 A | * | 8/1989 | Book, Sr. ..................... | 376/216 |
| 5,023,045 A | * | 6/1991 | Watanabe et al. ........... | 376/215 |
| 5,101,337 A | * | 3/1992 | Ebizuka ...................... | 700/79 |
| 5,315,502 A | * | 5/1994 | Koyama et al. ............... | 700/79 |
| 5,634,039 A | * | 5/1997 | Simon et al. .................. | 703/18 |
| 5,748,199 A | * | 5/1998 | Palm .......................... | 345/473 |
| 5,886,953 A | * | 3/1999 | Kawahara et al. ............. | 368/66 |
| 6,013,158 A | * | 1/2000 | Wootten ...................... | 202/99 |
| 6,408,227 B1 | * | 6/2002 | Singhvi et al. .............. | 700/266 |
| 2005/0179663 A1 | * | 8/2005 | Ludwig ...................... | 345/167 |
| 2007/0136038 A1 | * | 6/2007 | Kato et al. ..................... | 703/6 |

FOREIGN PATENT DOCUMENTS

| | | |
|---|---|---|
| JP | 6-222191 | 8/1994 |
| JP | 9-134213 | 5/1997 |
| JP | 10-214112 | 8/1998 |

* cited by examiner

*Primary Examiner*—Paul L Rodriguez
*Assistant Examiner*—Eunhee Kim
(74) *Attorney, Agent, or Firm*—Westerman, Hattori, Daniels & Adrian, LLP.

(57) ABSTRACT

A plant operation support system of the present invention is characterized by the following: The present invention relates to a plant operation support system which performs process simulations in parallel with operations of an actual plant and predicts operations of the actual plant on the basis of the results simulated. The plant operation support system modifies a simulation model on the basis of actual data as required, modifies the simulation model on the basis of actual data received from the actual plant, and uses the modified simulation model to perform simulations in parallel with operations of the actual plant. Accordingly, the plant operation support system can reflect plant status in the simulation model consecutively and predict operations of the actual plant in a highly accurate manner.

16 Claims, 6 Drawing Sheets

PLANT OPERATION SUPPORT SYSTEM

BACKGROUND OF THE INVENTION

1. Field of the Invention

This invention relates to a plant operation support system for use in the operation of plants with complicated behaviors such as petroleum refining chemical processes and water-treatment processes of water and sewage.

2. Description of the Prior Art

Some of the conventional plant operation support systems using plant simulators are described in Patent Documents 1 to 3.

According to the invention (Prior Art 1) described in Patent Document 1, a plant operation support system operates a plant simulator in synchronization with a plant, generates initial data for prediction simulations on the simulator, and predicts plant behaviors by performing high-speed simulations on the basis of the initial data.

According to the inventions (Prior Art 2) described in Patent Documents 2 and 3, a plant operation support system operates a plant simulator in synchronization with a plant and changes the parameters of simulation models.

(Patent Document 1)
Japanese Unexamined Patent Application Publication No. 1994-222191

(Patent Document 2)
Japanese Unexamined Patent Application Publication No. 1997-134213

(Patent Document 3)
Japanese Unexamined Patent Application Publication No. 1998-214112

However, there is a problem with Prior Art 1 in that because the parameters used in the simulator are not modified, the accuracy of predictions of plant operations is poor.

Although the invention described in Patent Document 3 automatically adjusts parameters in plant models, it uses plant data which has already been acquired and recorded. Therefore, it does not provide on-line synchronization with actual plant operations and is primarily intended to adjust the parameters of plant simulators.

SUMMARY OF THE INVENTION

The present invention is designed to solve the above-mentioned problems. An object of the present invention is to achieve a plant operation support system which can predict operations of an actual plant in a highly accurate manner by modifying a simulation model on the basis of actual data as required and performing simulations in parallel with operations of the actual plant in real time, thus reflecting the conditions of the actual plant consecutively in the simulation model.

DESCRIPTION OF THE PREFERRED EMBODIMENTS

The present invention is described in detail below with reference to the drawings.

Figure 1:
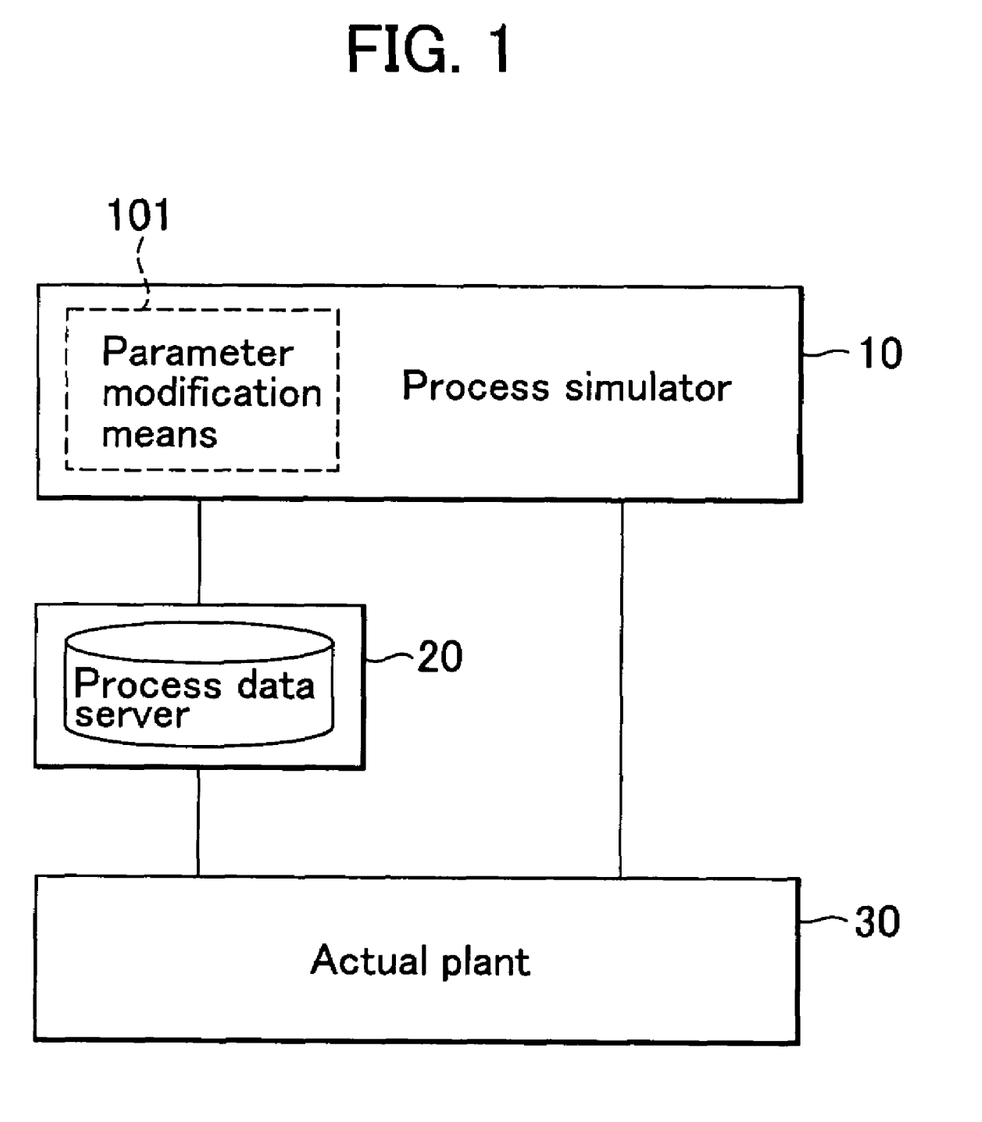
FIG. 1 is a configuration diagram illustrating an embodiment of a plant operation support system of the present invention.

FIG. 1 is a configuration diagram illustrating an embodiment of the present invention.

In FIG. 1, process simulator 10 receives process data from actual plant 30 by way of process data server 20.

Process simulator 10 operates in synchronization with actual plant 30. Every time process data is supplied from actual plant 30 to process simulator 10, process simulator 10 modifies parameters of calculation equations for a simulation model in process simulator 10, and performs calculations. Process simulator 10 outputs calculated results. These results become simulated outputs.

Figure 2:
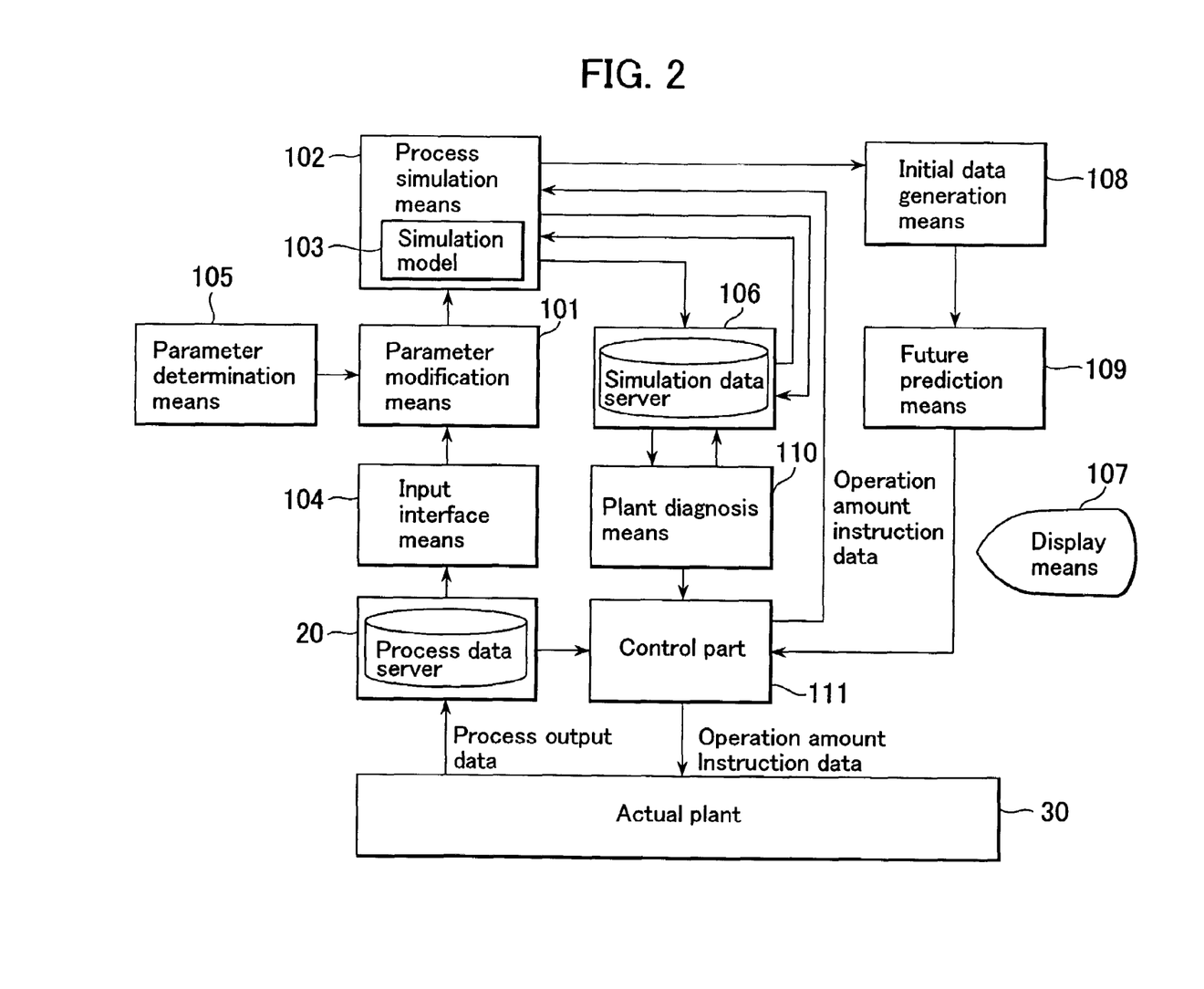
FIG. 2 illustrates a concrete configuration example of the plant operation support system of FIG. 1.

FIG. 2 illustrates a concrete configuration example of the plant operation support system of FIG. 1. In FIG. 2, elements also common to FIG. 1 are labeled with the same numbers as those in FIG. 1.

Process simulation means 102 uses simulation model 103 to perform a process simulation for operations of actual plant 30. This process simulation is performed in parallel with operations of actual plant 30.

Data of a sensor (not illustrated) in actual plant 30 is sent by way of process data server 20 and input interface means 104 to parameter modification means 101.

Parameter determination means 105 selects parameters for modification on the basis of correlations between plant data and variables of simulation model 103. A change to parameters of simulation model 103 affects final simulation results. Parameter determination means 105 selects parameters with high correlations in advance according to data for plant activation or analytical results of model equations.

Parameter modification means 101 uses supplied process data to modify parameters consecutively which are selected by parameter determination means 105. Parameter modification means 101 modifies parameters in such a way as to match the simulated outputs of process simulation means 102 with the actual outputs of actual plant 30.

The modified parameters are sent to process simulation means 102. Based on the modified parameters, process simulations comprising physical and chemical model equations are calculated. Simulated results are stored in simulation data server 106. Based on the stored data, process simulation means 102 allows display means 107 to display the physical amount of a location which cannot be measured in actuality. In addition, process simulation means 102 allows display means 107 to display, among the calculated results of simulations, process data which cannot be detected in actual plant 30 as well as characteristic data of devices or materials.

Process simulation means 102 uses simulation model 103, wherein parameters are modified, to perform simulations in parallel with operations of actual plant 30 in real time.

In simulations in parallel with operations of actual plant 30, parameters are modified in such a way to match outputs of simulation model 103 with outputs of actual plant 30.

In the event a plant operator provides instructions which cause process simulator 10 operating in parallel with actual plant 30 to operate at a speed higher than the operating speed of actual plant 30 for the purpose of predicting trends of a predetermined time ahead (for example, several minutes ahead or several hours ahead), results of a process simulation at a certain time are received as initial data by way of initial data generation means 108. Then, initial data for high-speed simulations are generated. The initial data in this case is the parameter data of simulation model 103, setting conditions, and so on.

Future prediction means 109 uses this initial data and performs calculations at high speed by accelerating the time of process simulator 10 by, for example, the usual several times to several hundred times. In addition, future prediction means 109 receives actual data from actual plant 30 at a predetermined time and modifies parameters (status variables) of simulation model 103.

Future prediction means 109 displays the simulated results of future trends on display means 107. In addition, future prediction means 109 sends the simulated results of future trends to control part 111 for the purpose of feeding them back to the control of actual plant 30.

Plant diagnosis means 110 provides plant diagnoses by comparing a parameter value modified in the current simulation with parameter values modified in past simulations.

Plant diagnosis means 110 compares a parameter change in the current process simulation with parameter changes of simulation model 103 in past process simulations and, if the difference between the two exceeds a predetermined tolerance, reports the difference as a plant abnormality to control part 111, and notifies plant operators of the difference by way of a screen indication on display means 107. In other words, if the parameter change in the current process simulation significantly deviates from parameter changes stored as past data, plant diagnosis means 110 reports the difference between the two as a plant abnormality. Control part 111 is a controller which provides operation amount instruction data to actual plant 30 or data of actual plant 30 to process simulation means 102.

Then, plant diagnosis means 110 uses a model equation of simulation model 103 to estimate which location of actual plant 30 is abnormal.

Moreover, plant diagnosis means 110 checks consistency between data calculated by process simulation means 102 and the actual data obtained from actual plant 30 and, if the difference between the two exceeds a predetermined tolerance, displays the difference as a plant abnormality on display means 107.

Process simulator 10 of FIG. 1 corresponds to parameter modification means 101, process simulation means 102, and simulation model 103.

While the behaviors of processes which accompany microorganism reactions or chemical reactions are extremely complicated in comparison with the behaviors of mechanical or electric systems, some process simulators have actively employed physical or chemical models. Even if such models are incomplete, it is possible to provide actual plant data to these simulators, to compensate for some parameters of the models, and to simulate plants satisfactorily.

In process simulator 10 of the present invention, simulation model 103 is represented by a physical or chemical model. Therefore, it is possible to treat and visualize not only physical information, such as temperatures and flow rates of locations, for which sensors cannot be mounted in actual plants but also information such as relative proportions and boiling points which cannot be measured or observed in actuality.

Moreover, the present invention allows process simulation means 102 to operate at a speed higher than the plant operating speed and obtains predicted trends of several minutes or several hours ahead of the present time so that those trends can be utilized by plant operators in plant control. Furthermore, the present invention enables comparisons between the results of past simulations and those of the current simulation for the purpose of plant diagnoses so that early discovery of plant abnormalities or timely replacement of maintenance parts such as filters can be achieved.

Plant control may be performed manually by plant operators looking at a screen for predicted trends or automatically by control part 40.

If, for example, process simulation means 102 and future prediction means 109 are located on the same computer, process simulation means 102 may be stopped in a simulation which future prediction means 109 performs at high speed, so that loads on CPUs can be reduced.

If the parameters of a simulation model which modifies them according to empirical knowledge are already known, parameter determination means 105 is not required.

If a computer has a high computing capability, off-line calculations of parameter determination means 105 may be performed on-line, i.e., while a plant is actually in operation.

Next, a display device of a plant operation support system of the present invention is explained. To begin with, examples of conventional display devices are explained briefly.

Figure 3:
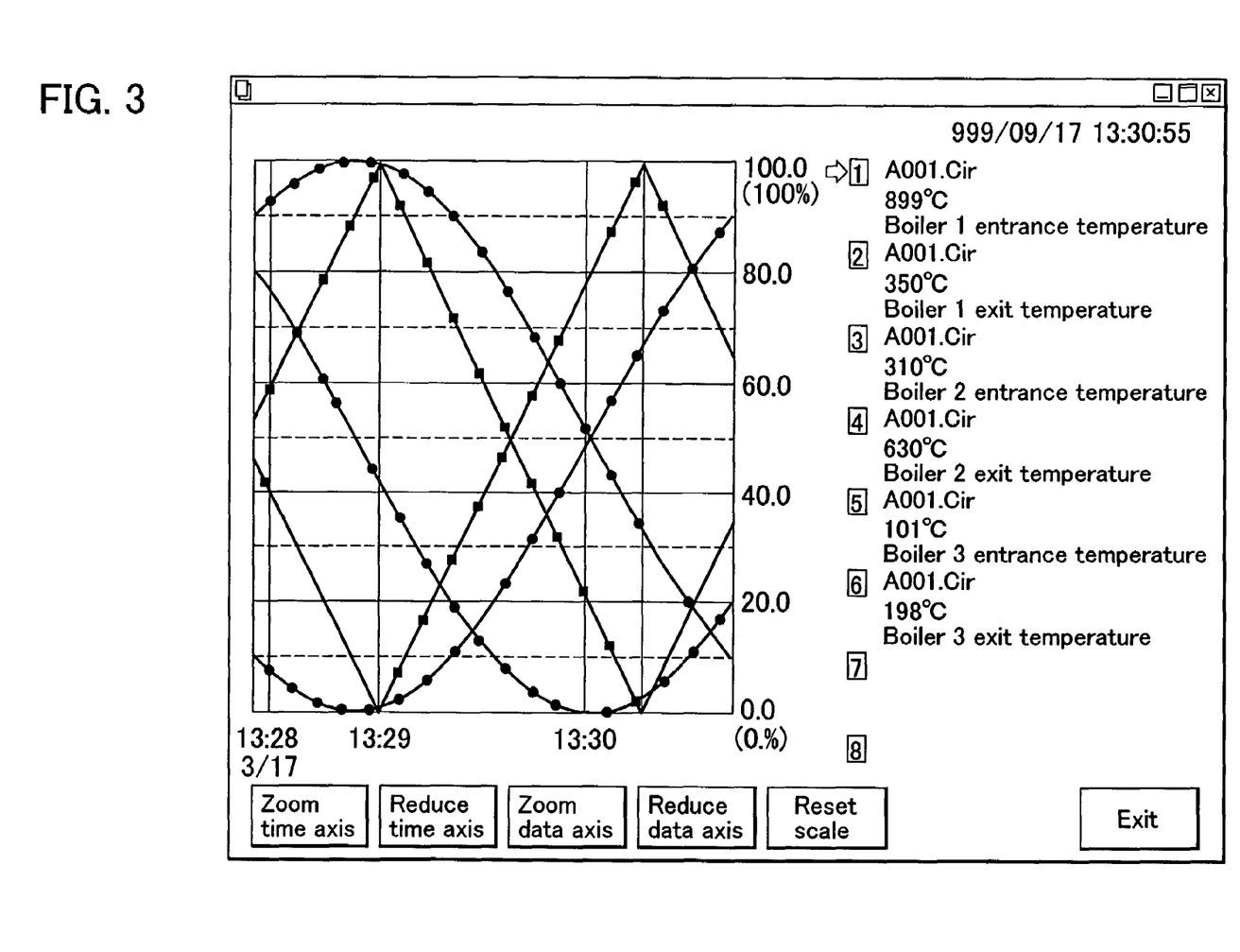
FIG. 3 illustrates a conventional typical process trend screen.

FIG. 3 illustrates a typical process trend screen which has been used conventionally.

This screen displays the time-series data of a sensor arranged in a plant as trend data or historical data to monitor abnormalities and so on which occur in the plant.

However, these conventional plant operation support systems have not provided on-line predictions of plant operation status.

Figure 4:
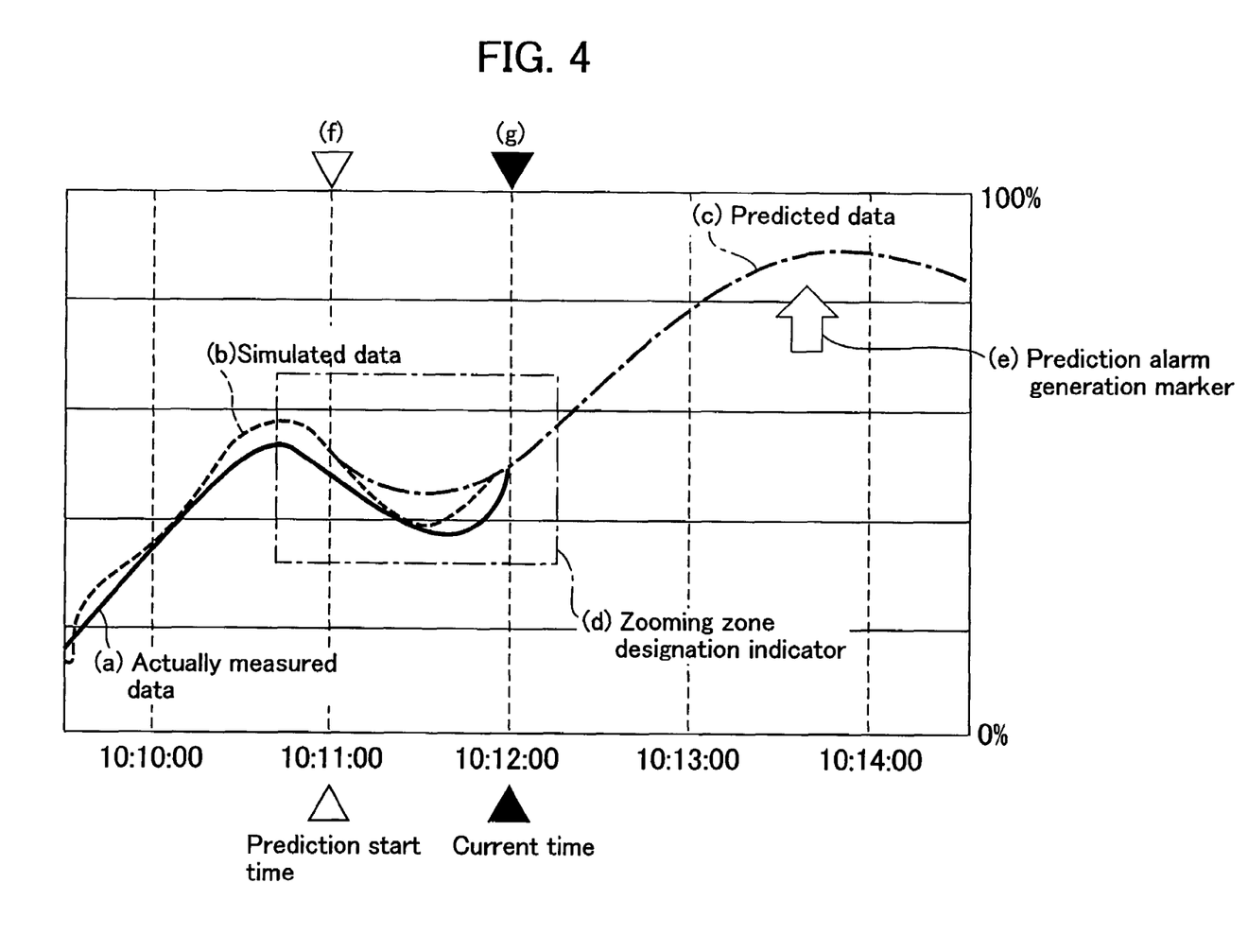
FIG. 4 illustrates an example of a screen for display means of the plant operation support system of the present invention.

FIG. 4 is a screen example of a display device of a plant operation support system of the present invention. The horizontal axis is the time axis indicating the past, present and future, while the vertical axis shows 0 to 100 percent. This example shows the time axis from slightly before 10:10:00 until slightly after 10:14:00 with current time (g) in the center. In FIG. 4, curve (a) shows actually measured data, which is the process output data from actual plant 30, while curve (b) shows simulated data which is the simulated output of process simulation means 102 in FIG. 2. This simulated data shows a time-series status such as temperature distribution in a reactor or a physical constant of a product in the reactor.

Curve (c) is an output from future prediction means 109 and shows a prediction starting at 10:11:00 and continuing to slightly after 10:14:00. This curve is displayed when an operator activates a prediction simulation from a certain time up to a designated time or in a periodical manner by way of a display device screen and so on. Plant simulator 10 (refer to FIG. 1) uses a simulated status amount at a time when activation of a prediction simulation is instructed, performs the simulation up to a designated time ahead of the actual time, and shows the results on a display screen.

In FIG. 4, if a zooming zone is designated using an input device such as mouse on a trend graph which shows actually measured data, simulated data and predicted data, a zooming zone designation indicator presents the area to be zoomed and the area is zoomed.

Figure 5:
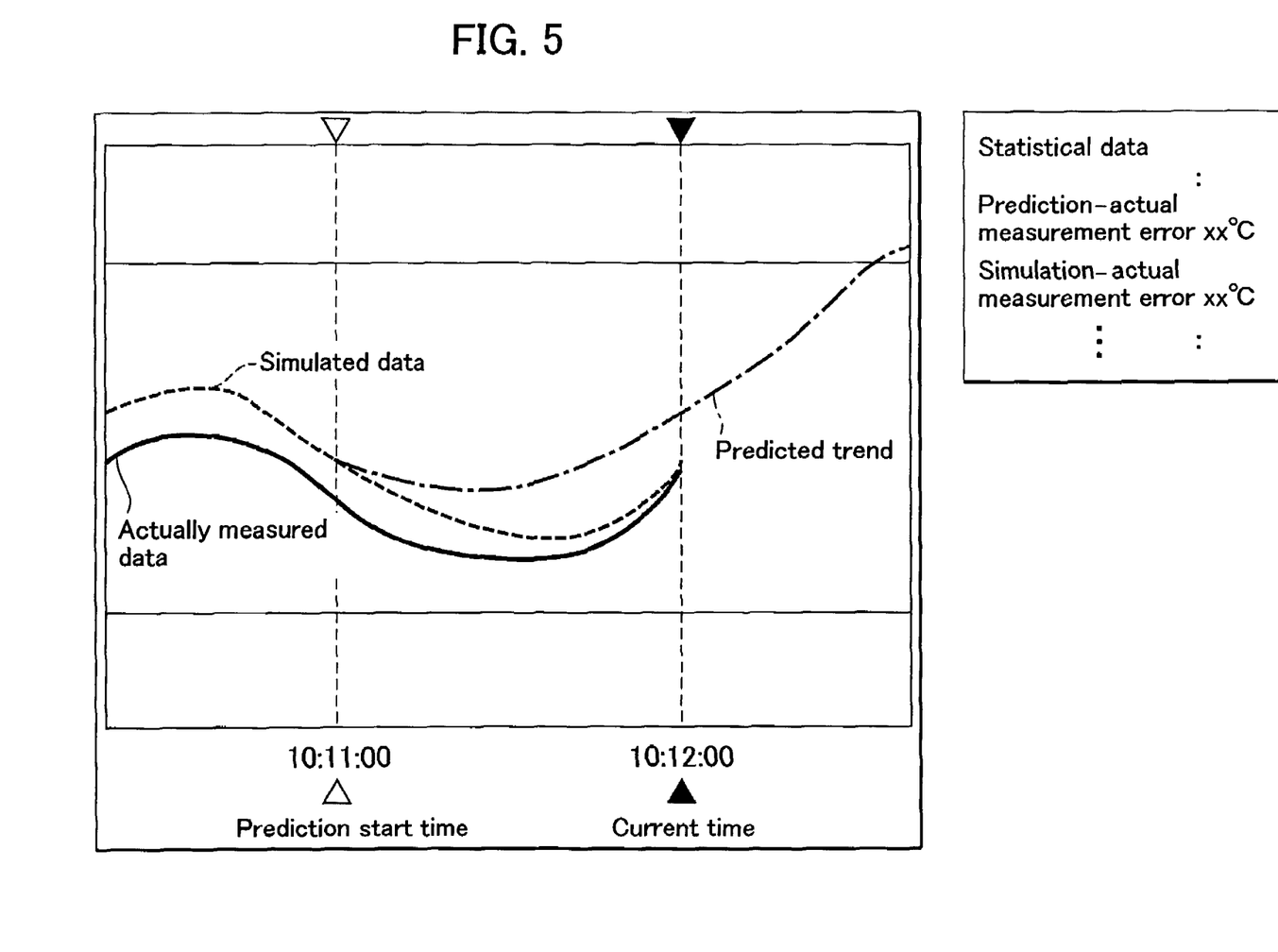
FIG. 5 illustrates a trend graph diagram wherein area (d) of FIG. 4 is zoomed.

FIG. 5 is a trend graph diagram wherein area (d) of FIG. 4 is zoomed by a zooming function. This screen shows that a prediction simulation was activated, that an indicator is displayed to present the activation time, and that a time-series prediction trend graph from that time onward until a designated time is overwritten.

The prediction trend graph is always updated to the latest one. The previous prediction trend graph is deleted from the screen.

The zoomed screen displays not only zoomed graphs but also the differences between actually measured data and simulated data within a designated zone or statistical data such as distribution data.

Back to FIG. 4, arrow (e) shows an alarm display method for prediction. In this display device, if predicted time-series data exceeds a predetermined tolerance, a prediction alarms is generated. Then, a prediction alarm generation marker is displayed at an expected generation time on a prediction trend graph and is indicated in a future prediction alarm summary.

Figure 6:
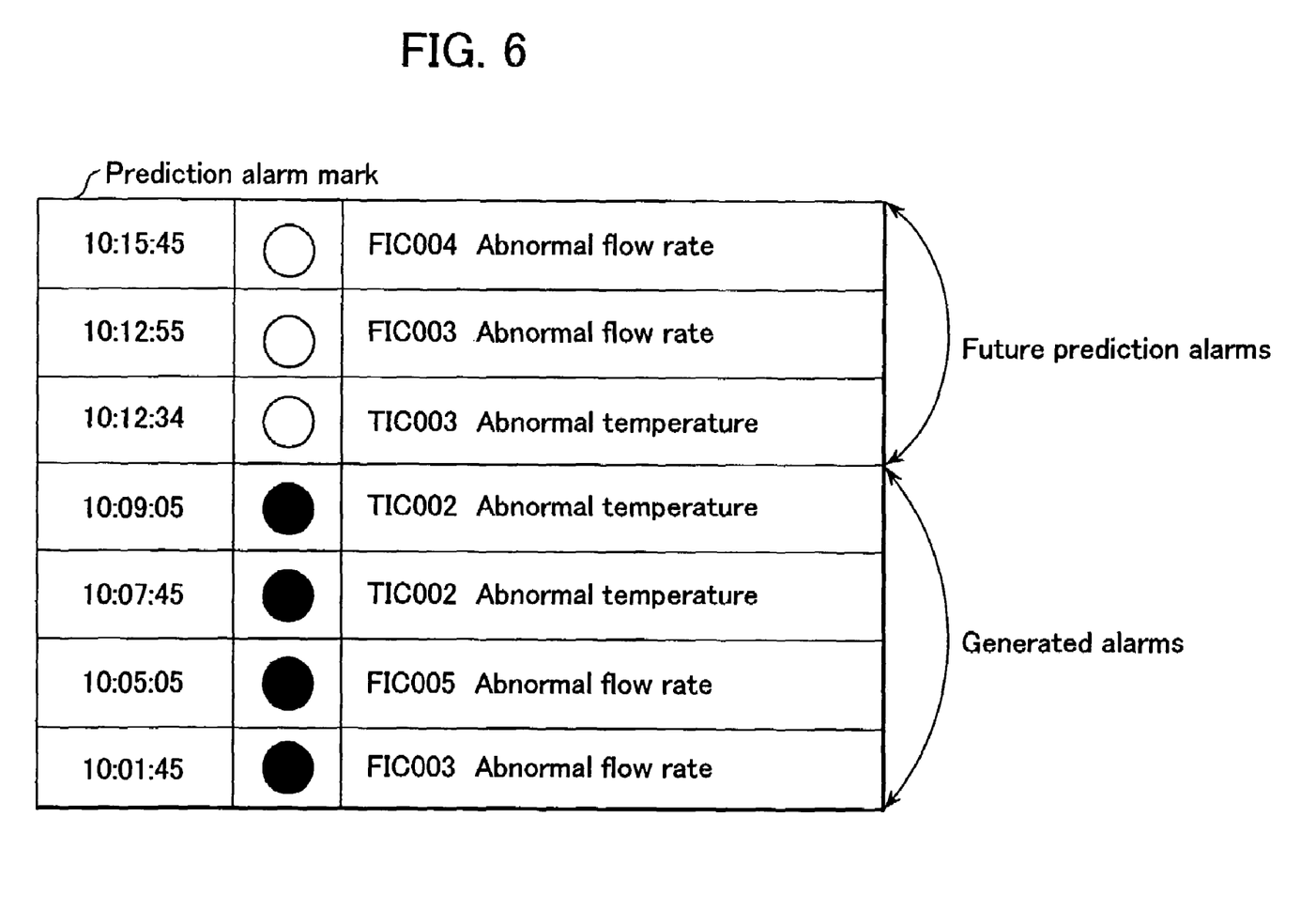
FIG. 6 illustrates an example of a future prediction alarm summary.

FIG. 6 illustrates an example of the future prediction alarm summary, wherein different colors or prediction marks are provided to distinguish between prediction alarms and actual alarms. In the example of FIG. 6, ● indicates alarms generated in the past, while ○ indicates prediction alarms. It should be noted that, if prediction alarms are avoided due to a change in an operation and so on, this will be deleted automatically.

According to a display device which performs the above-mentioned displays, future prediction trends of parameters in a plant are displayed so that more effective information than the conventional can be provided to operators. It is therefore effective in the early discovery of abnormalities in plants and the prevention of quality degradation. Moreover, future predictions make it possible to determine whether a current plant operation status is the optimum one or not.

It should be noted that the foregoing explanations are only provided to indicate certain suitable embodiments for the purpose of explaining and exemplifying the present invention. For example, one of the embodiments shows a plant simulator with enhanced accuracy based on parameter tracking as a future prediction function. However, it could be a prediction function using mathematical models. Also a future prediction trend screen can display trend data from the past until a prediction activation time on a separate window.

In addition, predicted time-series data, actually measured data, simulated data and so on can be displayed in different colors or line types.

Therefore, the present invention is not limited to the above-mentioned embodiments and includes many more changes or modifications without deviating from the essence of the present invention.

As can be clearly seen from the above explanations, the present invention provides the following benefits:

(1) A simulation model is modified on the basis of actual data received from an actual plant. Simulations are performed in parallel with operations of the actual plant using the modified simulation model. Therefore, the status of the actual plant can be reflected in the simulation model consecutively so that operations of the actual plant can be predicted in a highly accurate manner.

(2) The present invention makes it possible to present useful parameters which plant operators have not conventionally been able to see in actuality, so that errors in plant operations can be prevented.

(3) It will be possible for plant operators to predict plant abnormalities such as clogging of filters and leakage from pipes and to detect abnormalities at an early stage.

(4) Future prediction means allows the simulation model to perform simulations at a speed higher than the operating speed of the actual plant and obtain future trends, so that plant operators can predict plant behaviors several minutes or several hours ahead and reflect those predictions in plant control.

What is claimed is:

1. A plant operation support system using a plant simulator, comprising:

a parameter modification unit receiving actual data from an actual plant and modifying parameters of a simulation model on the basis of the actual data;

a process simulation unit using said simulation model with modified parameters and performing simulations in parallel with operations of said actual plant; and a parameter determination unit using correlations between plant data and variables of said simulation model and selecting parameters to be modified, wherein said parameter modification unit modifies the parameters selected by said parameter determination unit after receiving the actual data from said actual plant, wherein said parameter modification unit modifies the parameters in such a way as to match a simulated output of said process simulation unit with an actual output of the actual plant, wherein the plant operation support system is implemented by a computer, and wherein the simulation model reflects the actual plant.

2. The plant operation support system of claim 1, wherein said process simulation unit displays process data, which is not detected in said actual plant, and characteristic data of devices or materials among calculated results of simulations on a display unit.

3. The plant operation support system of claim 1, wherein the plant operation support system receives actual data from said actual plant at a predetermined time, modifies parameters of said simulation model, and allows said simulation model to perform process simulations at a calculation speed higher than the operating speed of said actual plant on the basis of the initial data of said simulation model if said initial data is set, and wherein the plant operation support system comprises:

a future prediction unit simulating future trends of said actual plant.

4. The plant operation support system of claim 3, wherein said future prediction unit displays the simulated results of future trends on a display unit.

5. The plant operation support system of claim 3, wherein said future prediction unit feeds the simulated results of future trends back to the control of said actual plant.

6. The plant operation support system of claim 1, wherein consistency between data calculated by said process simulation unit and the actual data received from said actual plant is checked and wherein any abnormality detected is displayed on a display unit.

7. The plant operation support system of claim 1, comprising:

a plant diagnosis unit which performs plant diagnoses by making a comparison between parameter data modified in past simulations and parameter data modified in the current simulation.

8. The plant operation support system of claim 2, wherein said display unit displays at least one of the screens for displaying time-series status amounts from the past to the present and the screen for providing trend displays of time-series predicts amounts of corresponding data from the present to the future.

9. The plant operation support system of claim 2, wherein said display unit memorizes a start time of a future prediction and displays said start time in a trend graph screen.

10. The plant operation support system of claim 2, wherein said display unit displays time zones and time steps for prior predictions in said displayed trend graph screen.

11. The plant operation support system of claim 8, wherein said display unit allows future time-series status amounts to be scrolled according to a size of said trend graph screen.

12. The plant operation support system of claim 2, wherein said display unit displays an expected alarm generation time when a displayed prediction status amount goes beyond a predetermined upper or lower limit.

13. The plant operation support system of claim 2, wherein said display unit clears a previous prediction status trend if a future prediction is requested again while a future prediction screen is being displayed.

14. The plant operation support system of claim 2, wherein said display unit displays time-series prediction status amounts for physical amounts of a location where a sensor cannot be deployed or physical amounts which cannot be measured by said sensor.

15. The plant operation support system of claim 2, wherein said display unit is equipped with a zooming function for horizontal and vertical axes.

16. The plant operation support system of claim 14, wherein said physical amounts is selected from the group consisting of temperature, flow rate and boiling point.

* * * * *